United States Patent [19]

Müller

[11] Patent Number: 4,946,115
[45] Date of Patent: Aug. 7, 1990

[54] DEVICE FOR TAKING UP A LINE

[76] Inventor: Gerhard Müller, Kiefernweg 1, 8901 Stadtbergen 2, Fed. Rep. of Germany

[21] Appl. No.: 209,914

[22] Filed: Jun. 22, 1988

[51] Int. Cl.$^5$ .................. A01K 89/0155; A01K 89/02
[52] U.S. Cl. .................. 242/289; 242/156.2; 242/303; 188/267; 188/271
[58] Field of Search .......... 242/84.52 B, 8.5 A, 242/84.51 A, 84.5 R, 84.51 R, 147 M, 155 M, 156, 156.2; 188/71.1, 72.1, 156, 163, 164, 267, 271

[56] References Cited

U.S. PATENT DOCUMENTS

| | | | |
|---|---|---|---|
| 2,482,428 | 9/1949 | Miller | 242/84.52 B |
| 2,528,271 | 10/1950 | Gibbs | 242/85.52 B |
| 2,598,846 | 6/1952 | Smith | 242/84.52 B |
| 2,607,820 | 8/1952 | Judd | 242/155 M |
| 3,721,394 | 3/1973 | Reiser | 242/84.52 B |
| 4,013,241 | 3/1977 | Gray | 242/84.52 B |
| 4,728,054 | 3/1988 | Pisapio | 242/84.51 A |

FOREIGN PATENT DOCUMENTS

| | | | |
|---|---|---|---|
| 604485 | 8/1960 | Canada | 242/84.52 B |
| 3643514 | 4/1988 | Fed. Rep. of Germany . | |

*Primary Examiner*—Katherine A. Matecki
*Attorney, Agent, or Firm*—Edwin D. Schindler

[57] ABSTRACT

A device for taking up and paying out a line such as a fishing line comprising a spool support, a spool arranged thereon and adapted to have said line wound and unwound therefrom, a central shaft around which said spool may be turned, and a braking device for braking said spool at least in the pay off direction. In order to provide for high accuracy and ease of operation there is at least one braking element able to be coupled with the spool in the pay off direction and at least one magnet adapted to apply the braking element against a counter-abutment stationarily arranged in relation to the braking element.

9 Claims, 2 Drawing Sheets

DEVICE FOR TAKING UP A LINE

BACKGROUND OF THE INVENTION

The invention relates to a device for taking up a line, more especially, a fishing line, comprising a spool mounted on a spool support and on which the line is wound and which at least in the pay off direction is able to be turned about a central axis and is braked by a braking device.

The braking action on a spool with the line wound thereon in the pay off direction is to ensure that once a fish has bitten the line remains taut. In known angling tackle the braking device as a rule consists of a braking jaw whose setting on the spool may be adjusted by a screw. A disadvantage in this respect is that the braking torque able to be set by means of such a brake and thus the force acting on the fishing line may be only very roughly preset, this possibly impairing spinning. Furthermore owing to wear the braking torque will continuously be changing so that indexing by means of a scale is practically not possible, this further impairing handling of the tackle. A further point is that the design of the known braking device also entails a mechanical, axial locking of the spool on the shaft thereof, and this impedes replacement of the spool and thus involves further disadvantages as regards handling the tackle. Known constructions are thus to be seen to be excessively inaccurate and not sufficiently user-friendly.

SHORT SUMMARY OF THE INVENTION

Accordingly taking this prior art design as a starting point one object of the present invention is to so improve a known device in a simple and economic manner that there is a high degree of accuracy.

A further aim of the invention is to provide such improved fishing tackle which is simpler to use.

In order to achieve these or other objects appearing in the present specification and drawings, in the pay off direction the spool is able to be coupled with at least one braking element, which is able to be applied by means of at least one magnet against a fixed counter-abutment on the spool support side.

In the case of the use of braking surfaces able to be brought into mutual engagement by the magnetic attraction the application of the brake element on the fixed counter-abutment ensures that there is an automatic compensation of wear. This leads to a full mutual engagement so that the unavoidable wear of the braking surfaces may not, as an advantageous feature of the invention, lead to reduction in the braking torque. A further advantage of the invention is to be seen in the fact that the magnetically attracted braking element does not require any mechanical securing means in the direction opposite to the magnetic force. If the magnetic force acts axially the spool may thus simply be locked in the axial direction on the braking torque which is magnetically held in place so that the entire unit is locked in place by the magnetic force and this simplifies the replacement of the spool to a very high degree. For this reason the unit consisting of the spool and the braking element may simply be pulled off by overcoming the magnetic force. At the same time the invention ensures that the magnetic application and thus the effective braking torque may be very precisely adjusted and thus accurately preset by changing the distance between the magnet and the element attracted by it. This may be achieved simply by adjusting the magnet or the magnets and/or by placing shims or spacers between the magnet and the element attracted thereby. Furthermore, owing to the relative motion between the magnet and the element attracted thereby eddy currents are able to be produced, which increase the braking action or are themselves sufficient as the only braking action. It will be seen from this that the invention achieves its objects with simple and economic means.

In accordance with an advantageous development of the invention the spool may be so mounted on a shaft fixedly joined to the braking element that it is stationary in the axial direction and is able to be rotated in the peripheral direction and is able to be coupled with a freewheel, adapted to lock in the pay off direction, with the shaft, which is preferably in the form of a hollow shaft and may be mounted on a further shaft (which is mounted on the spool support side) so that it may be turned and slid axially, such shaft extending past a collar comprising the counter-abutment. These features lead to a compact subassembly consisting of the spool and the braking element able to be coupled therewith and which may simply be slipped onto the shaft and is secured thereon by magnetic force so that further retaining means are not needed.

As part of a further advatageous feature of the invention the braking element may be arranged so that it is at a fixed distance from the spool. This ensures that the spool is able to turn in the take up direction as determined by the freewheel in relation to the braking element (which is then stationary) without any obstruction.

In accordance with a further feature of the invention the magnet or the magnets is or are mounted on the spool support so as to be opposite the braking element forming an armature consisting of magnetic material. These measures ensure a compact accommodation of a magnet arrangement which also provides a comparatively high attractive force. A further feature is that the braking element in this case performs the twin function of an armature and a braking element, something that simplifies construction.

The braking element may advantageously be in the form of a flange mounted on the jacket so as to fit around the end of the spool on the spool support side, the surface of the flange on the spool side being adapted to serve as the braking surface and which is opposite to a braking surface formed on the counter-abutment. The flange-like design of the braking element advantageously ensures that a large diameter is available without this having a disadvantageous effect as regards the overall size. It is an advantage to simply provide a magnet arrangement encircling the collar in the form of a ring so that there is the useful effect of a comparatively powerful magnetic force which acts concentrically in relation to the central middle shaft or axis.

A further feature of the invention is possible which is particularly advantageous and is such that the magnet or the magnets are arranged so that they may be adjusted in the axial direction. By axially changing the setting of the magnet or magnets it is possible to change the gap between the magnet and the element attracted thereby and thus to vary the effective applying force. These features thus lead to the advantage of a simple possibility of ensuring a precise preset of the desired braking torque. The setting means to be provided for ensuring the axial adjustment may then advantageously be provided with a scale, something that may further facilitate handling of the tackle. In accordance with a convenient further improvement of the above principle it is possible for the magnet or magnets to be mounted on an annular magnet support which is placed so as to encircle the collar and has smaller size than it in the axial direction, such element preferably being in threaded engagement with the collar so that by turning it is possible to bring about an axial adjustment corresponding therewith.

A further convenient feature of the invention is possible in accordance with which the flange forming the braking element radially projects beyond the collar and the end face adjacent to the flange of the magnet support is designed to function as the braking surface. This ensures that when the gap between the magnetic arrangement and the element attracted thereby is completely closed, it is possible to ensure an additional braking action. In order not to overload the magnet arrangement the latter may be conveniently so placed that it is set back in relation to the braking surface.

A further feature of the invention is such that between the braking surfaces of the braking element and the counter-abutment there is an intermediate element provided with braking surfaces on both its sides. Such an intermediate element advantageously serves so preset a fixed clearance. By the use of different intermediate elements with different braking properties it is possible to gain the advantage of further possibilities of variation. However, it would also be possible to only use the intermediate element for cleaning the braking surfaces.

In accordance with another advantageous feature of the invention it is possible for the magnet support to be secured to the housing and to fit around the shaft as a sort of collar past which the shaft extends, which is in the form of a hollow shaft and into whose bore a sliding pin is fitted, which is able to be moved by means of a set screw fitting into the bore (which is partly threaded) with which a peg extending from the shaft presses against an opposite support face of the hollow shaft which accepts the shaft and carries the braking element. In the case of this design the magnet support is not itself adjusted so that it may be secured to the housing. This leads to the advantage of a play-free arrangement unable to wobble of the magnet support, something that leads to a high accuracy of its operation and setting. At the same time it is possible to ensure that the magnet support is not able to lose its set position. A further useful effect is to be seen in the simple manufacture of such an arrangement.

Further convenient developments and advantageous of the invention will be gathered from the ensuing account of preferred working embodiments thereof and from the claims.

LIST OF THE SEVERAL VIEWS OF THE DRAWINGS

DETAILED ACCOUNT OF WORKING EXAMPLES OF THE INVENTION

Figure 1:
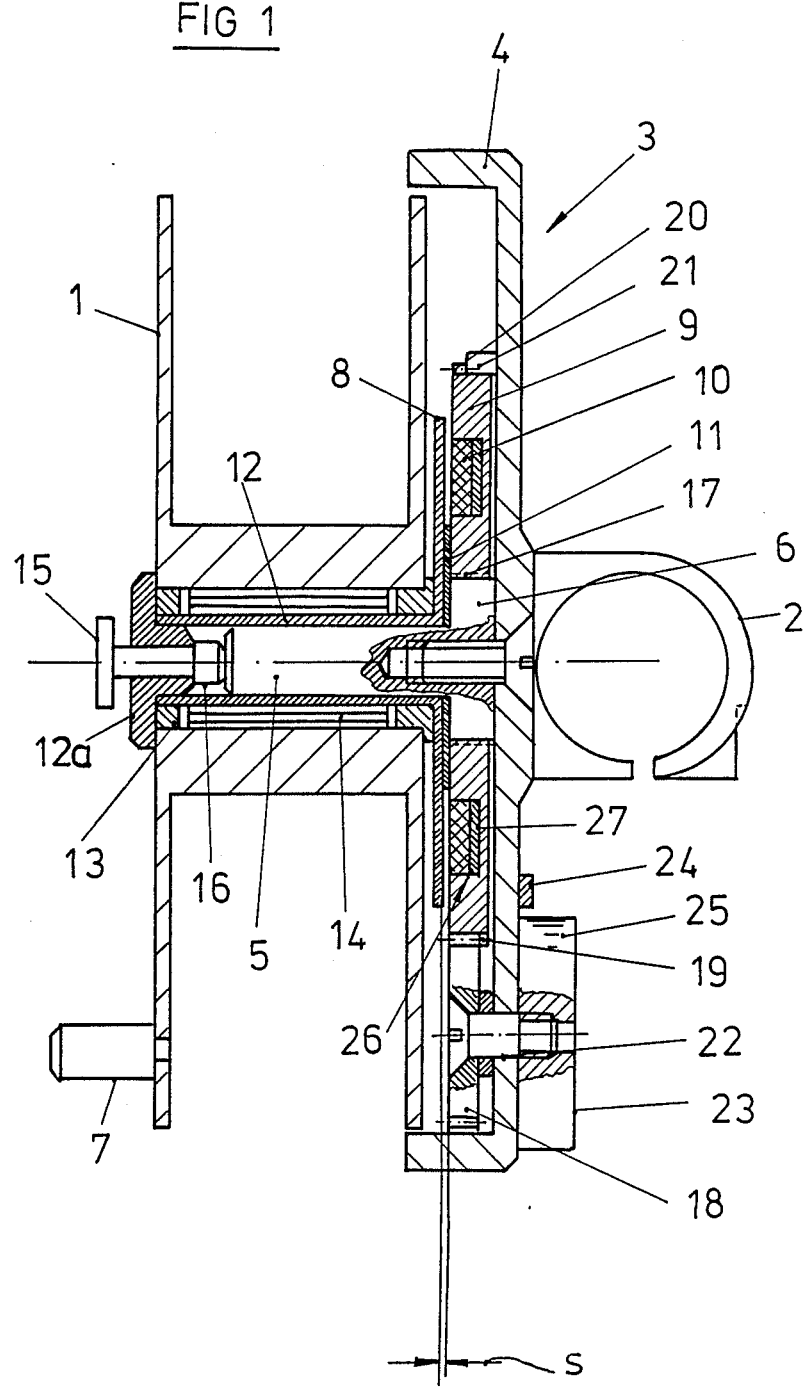
FIG. 1 is a radial section taken through a first working embodiment of the invention in the form of a flyfishing spool device detachably mounted on a fishing rod with an adjustable magnet support.

The basic design of fishing tackle is generally known and thus does not require any explanation in the present context. The fly-fishing spool device shown in the drawing consists of a spool 1 for the coils of the fishing line (not shown) therein and a spool support 3 able to be mounted on the rod by means of securing means indicated at 2. The spool support 3 has the spool 1 mounted on it. It has a cover-like housing 4, on which a centrally arranged shaft 5 is attached for the spool 1 to be placed on. The shaft 5 may be made in one piece with the housing 4. In the working embodiment of the invention shown the housing 4 and the shaft 5 are screwed together. At its end adjacent to the housing the shaft 5 is provided with a radial collar 6, which limits the mutual engagement of the spool 1 and the spool support 3. In the present illustrated form of the invention the spool 1 only has its flange adjacent to the support fitting into the housing 4.

The spool 1, which is fitted with a handle 7, is able to be freely turned in the direction of line take up in relation to the shaft 5 on which it is mounted. On the other hand in the pay off direction the resistance of a brake has to be overridden. For this purpose there is a braking element 8 which in the pay off direction may engage the spool 1, fits around the spool 1 on the support side and is in the form of a disk, which may be applied to the adjacent end side of the collar 6 functioning as a counter-abutment by means of magnets 10 mounted on a magnet support 9 carried on the spool support 3. In the present illustrated case the braking element 8 is itself attracted by the magnets 10, that is to say it at the same time serves as an armature. The braking element 8 accordingly consists of magnetic, f. i. feromagnetic, material and has a configuration such that it extends past the collar 6 at far as the magnets surrounding the collar 6. The spool 1 able to be coupled with the braking element 8 acting as an armature, consists of nonmagnetic material, as for example an aluminum and/or magnesium alloy. The collar 6 and the disk-like braking element 8 may be so arranged that their facing end braking faces are directly in contact with each other. In the present working example of the invention there is an intermediate element placed in between, whose two faces are designed to serve as braking surfaces and which cooperate with the braking surfaces on the braking element and on the collar. The intermediate element 11 which is also in the form of a disk in this comes to an end radially within the magnets 10 arranged in the form of a ring and has the braking element 8 extending past it radially which at the same time functions as an armature. By the use of different materials for the intermediate elements with different coefficients of friction it is possible to preset the braking torque on the spool. In order to set different braking torques it is therefore simply possible to have a set of different intermediate elements 11, which may be used alternately.

In the present example of the invention the disk-like braking element 8 is in the form of a flange on a hollow shaft 12 which is able to rotate freely on the shaft 5 and is able to be slipped on in the axial direction until abutment occurs. The hollow shaft 12 extends into the central hole in the spool 1 and is supported in relation to it by axial and radial bearings 13, between which there is a freewheel 14 preventing rotation in the pay off direction and connecting the spool 1 with the hollow shaft 12. In the take up direction as permitted by the freewheel 14 the spool 1 may be freely turned in relation to the hollow shaft 12. The hollow shaft 12 is thus retained by the braking effect due to the braking element 8. On the other hand in the pay off direction the spool 1 is coupled with the hollow shaft 12 so that the latter and thus the braking element 8 connected therewith are entrained, the braking force acting thereon being overcome. In the illustrated working example of the invention the spool bearing 13 is so designed that the spool 1 is spaced from the braking element 8 fitting round it and is thus able to freely turn in the take up direction in relation to the braking element which then does not move. The freewheel 14 may switched over from the clockwise to the opposite direction so that the direction of pay off may be changed.

Since the spool 1 is fixed axially by means of the bearings 13 on the braking element 8 pulled magnetically against the housing 4, no axial retaining means is required cooperating with the end of the shaft 5 which is opposite to the collar 6. In fact, it is possible for the entire subassembly consisting of the spool 1 with the inserted hollow shaft 12 carrying the braking element 8, to simply be slipped on the shaft 5 and pulled off the shaft again 5 by overcoming the magnetic forces. In the illustrated working example of the invention this action of pulling off the subassembly may be facilitated by having a plunger which is axially able to slide in an end cover 12a of the hollow shaft 12 and which at its outer, projecting end is provided with a thrust head 15. The other inner end of the plunger 16 is able to be brought into engagement with the opposite front end face of the shaft 5 which is fixed to the housing.

In this case the magnet support 9 is in the form of a ring surrounding the collar 6 and designed to be somewhat narrower than the collar 6 in the axial direction. As indicated at 17 the inner face of the ring is screw threaded and is screwed onto the collar 6. The collar 6 is accordingly provided with an external screw thread. By turning the magent support 9 around the central shaft it is thus possible to produce a setting motion in the axial direction so that the gap s between the magnet arrangement and the element attracted thereby and thus also the effective applying and braking force may be varied. In the present working example as illustrated the magnet support 9 is in its setting corresponding to the smallest size of the gap. By suitable turning it is possible for the magnet support 9 to be moved to the right in terms of the drawing so that the gap 2 is enlarged and the applying and braking forces are correspondingly decreased. The rotation of the ring forming the magnet support 9 is caused by a pinion 18 bearinged in the housing 4 so as to cooperate with a ring of teeth 19 arranged at the outer periphery of the ring forming the magnet support 9. The helix angle of the thread 17 is so chosen that a twist of 180° or less is sufficient in order to cause the full possible axial adjustment. The ring 19 of teeth accordingly does not extend for 360° but is so limited that there are two spaced end faces 20 spaced by the desired angle of turning. In order to limit the angle of turning it is then simply possible to have an abutment pin 21 fixed to the housing against which the end surfaces 20 come to abut in the respective end setting. The pinion 19 is connected via a shaft fitting through the housing wall with a crank 23 arranged outside the housing 4 and in the present case designed in the form of a button. This crank 23 may be provided with a scale or mark means 24 fixed to the housing so as to cooperate with a pointer or scale device 25 on the crank.

The flange of the hollow shaft 12 which forms the braking element 8 and is designed to function as a magnetically attracted armature extends, as has already been indicated earlier, radially beyond the collar 6 as far as a position adjacent to the magnets 10 arranged in the form of a ring. The disk-like intermediate element 11 may have the same diameter. In the present example of the invention the intermediate element 11 ends radially within the magnet arrangement. The end side adjacent to the flange of the annular magnet support 9 may be in the form of a braking surface like the end side adjacent to the flange of the collar 6. This braking surface is in the end position of the magnet support 9 shown which is to the left in the drawing. In this setting the gap s is smallest so that the attractive forces are largest on the intermediate element or if no such element is used on the adjacent braking surface of the braking element 8 so that there is an increase, exceeding the braking surface of the collar 6, of the effective braking surface. As long as the magnet support 9 has not reached the left hand end position, braking only takes place on the braking surface of the collar 6. In order not to damage the magnets 10 the latter may be arranged to be set back somewhat in relation to the end face on the braking element side of the magnet support 9.

The magnets 10 are in the form of small button-like rod magnets of permanently magnetic material. In principle one such a magnet would suffice. In order to achieve a high magnetic force and an attractive force which is not skew in relation to the central shaft it is however preferred to have a number of magnets evenly spaced out on the periphery. In the present working example of the invention the magnets 10, as indicated earlier herein, are arrayed in the form of a ring. In order to mount this magnet arrangement in the form of a ring the annular magnet support 9 is provided with a coaxial annular groove open towards the braking element and in which the button-like magnets are bonded. On the floor of this annular groove 26 there is a coaxial ring 27 of magnetizable material, as for instance ferromagnetic steel. This ring 27 is responsible for a magnetic connection of the adjacently placed button-like magnets 10. The magnet support 9 provided with internal and external screw threads may in this case be in the form of a simple cast or pressed component of nonmagnetic material, as f. i. plastic.

Figure 2:
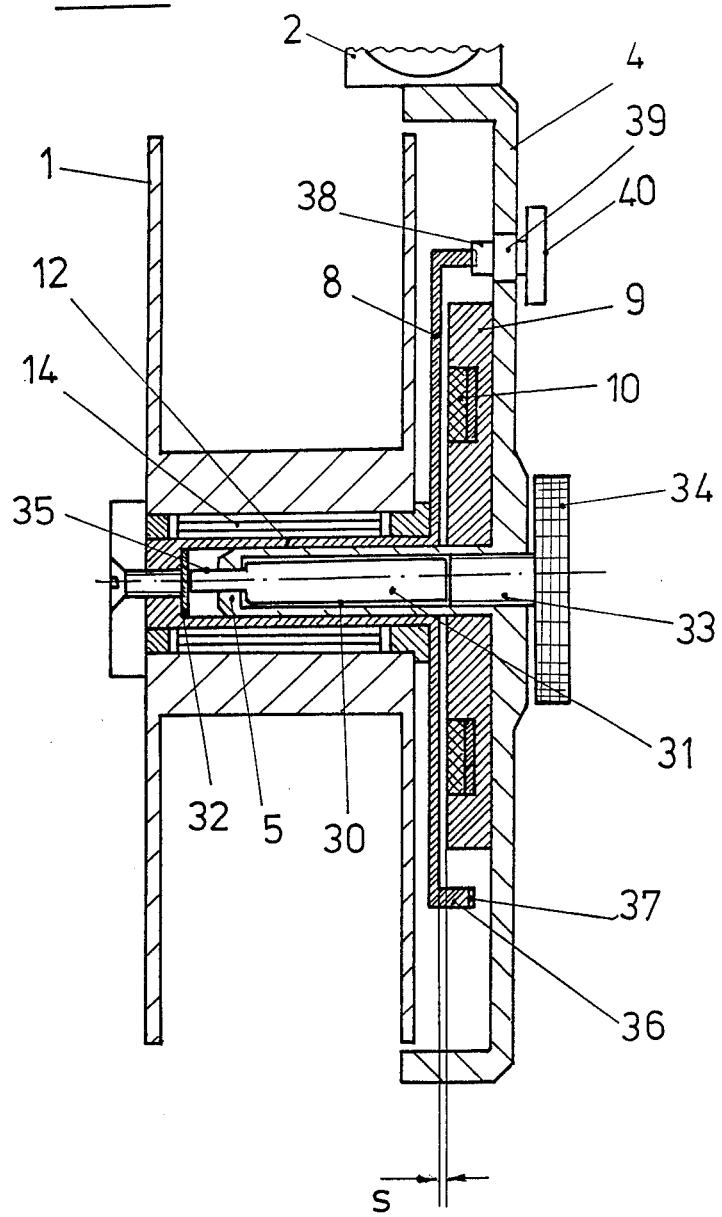
FIG. 2 is a radial section taken through a second example of a fly-fishing spool device detachably mounted on a rod and having a magnet support secured to the housing.

The general mechanical design of the arrangement shown in FIG. 2 is the same as that of the arrangement of FIG. 1 as described above. In what follows only the difference between the two arrangements will be explained, such differences leading to a very simple but nevertheless functionally reliable and simply operated arrangement, like parts being denoted by like references for the sake of simplicity.

Unlike the arrangement of FIG. 1 in the second design the magnet support 9 is secured to the housing 4 and for this purpose the magnet support 9, which fits around the shaft 5 fixed to the housing 4, like a sort of collar is bonded to the housing 4. The shaft 5 formed on the housing 4 in the present case is in the form of a hollow shaft provided with a central bore 30. In the bore 30 there is an axially moving pin 31 able to be set for adjustment of the gap s between the braking element 8 and the magnets 10 arranged on the magnet support 9. The pin 31 has its front end projecting beyond the hollow shaft resting against a bearer surface 32 of the hollow shaft 12 which is placed on the hollow shaft 5 and able to be coupled with the spool 1 via the freewheel 14. The rear end of the pin 31 engages a set screw 33 able to be screwed into the bore 30, which is threaded for part of its length. The screw 3 has a driving head 34 arranged outside the housing 4.

By turning the set screw 33 the pin 31 is moved so as to extend to a lesser or greater extent from the bore 30 so that the hollow shaft 12, which is provided with a flange forming the braking element 8, is pushed against the magnetic attracting force exerted by the magnets 10 on the braking element 8 consisting of magnetic material to a greater or lesser extent off the shaft 5. The magnetic force of attraction ensures that the bearer surface 32 of the hollow shaft 12 is kept in contact with the pin 30. The magnets 10 tend to retain the flange, formed on the hollow shaft 12, constituting the braking element 8 to prevent it from turning, the retaining force opposing rotation in the pay off direction of the spool 1 becoming greater with a decrease in size of the gap s. In the setting of the set screw 33 in which the braking force is maximum the braking element 8 and the magnet carrier 9 may come into contact in order to attain an additional mechanical braking force.

Since the magnet support 9 does not have to be displaced and may be fixed to the housing 4, there is a play-free and wobble-free arrangement of the magnet support 9, this increasing the accuracy and functional reliability.

The front end, extending from the hollow shaft 5, of the pin 31 is in the form of a peg 35, whose diameter is smaller than the diameter of the rear end, cooperating with the set screw 33, of the pin 31. This ensures that the pin is not turned on turning the hollow shaft 5 by the latter. There is thus no danger of the pin 31 accidentally shifting the set screw 33 and thus changing the size of the gap 2. In order to ensure a particularly low degree of friction on the end bearer surfaces of the pin 31 the latter is made of polyamide. For the same reason in the present case a ring with the bearer surface 32 thereon and made of polyamide is fixed on the hollow shaft 12.

In many cases it is desirable for the rotation of the spool 1 in the pay off direction to be accompanied by an audible sound. In order to produce such a sound the flange forming the braking element is provided with a peripheral cuff 36 which at its end is provided with V-like notches engaged by a pin 38 which is pressed into engagement therewith by a drive spring. The pin 38 and the associated drive spring are placed in a bushing 39 arranged in the housing 4. The force exerted by the spring acting on the pin 38 is able to be adjusted by a setting head 40. The use of such a noise producing device would naturally also be possible in the case of the arrangement of FIG. 1 as well.

The invention has been described above with reference to so-called fly-fishing spool units but it is not limited thereto and may be readily applied to so-called stationary spool units or a so-called multispool with advantage. In place of the magnet arrangement used here on the housing and the armature arrangement on the spool the magnet might be placed on the spool and the armature on the housing. It would also be possible to have an additional armature in place of the braking element exerting the function of an armature. In any event owing to the attraction between the magnet and the armature magnetic lines of force come into existence which are deformed on relative motion between the magnet and the armature so that in the arrangement of FIG. 1 the braking action is increased and in the arrangement of FIG. 2 the braking action is entirely produced thereby.

I claim:

1. A device for taking up and paying out a line, comprising:
   a spool support having a cover-like housing;
   a spool arranged on said spool support and adapted to have the line wound and unwound therefrom, said spool being made of a non-magnetic material, said spool having an end face;
   a first central hollow shaft around which said spool is capable of being turned;
   a second shaft being mounted on said cover-like housing of said spool support, said first central hollow shaft being mounted on said second shaft on a side of said spool so as to be able to rotate and to slide axially;
   a braking device for braking said spool, at least in a pay-off direction, said braking device having at least one braking element, with a space existing between said braking element and said spool, said braking element being in the form of a flange mounted on said first central hollow shaft and fitting around the end face of said spool on a support side thereof, said braking element including means for preventing an axial shift of said spool relative to said first central hollow shaft, means for coupling said spool to said central shaft in the pay-off direction;
   a counter-abutment adjacent said braking element, said braking element being capable of being applied against said counter-abutment;
   at least one magnet adapted to apply said braking element against said counter-abutment stationarily arranged in relation to said braking element of said braking device on said spool support; and,
   means for adjusting a distance between said at least one magnet and said braking element.

2. The device as claimed in claim 1 wherein the first hollow shaft and the braking element are made integral with each other.

3. The device as claimed in claim 1 wherein the at least one magnet is a permanent magnet.

4. The device as claimed in claim 1 wherein said means for adjusting the distance between said at least one magnet and said braking element moves said at least one magnet in an axial direction with respect to said spool.

5. The device as claimed in claim 4 comprising an annular magnet support mounting the at least one magnet and having a smaller axial thickness than the counter-abutment said counter-abutment being screwed to the spool support.

6. The device as claimed in claim 5 further comprising a terminal annular groove in the magnet support wherein the at least one magnet is arranged in the terminal annular groove.

7. The device as claimed in claim 1, wherein said flange being provided with an encircling cuff to form a noise producing device, said cuff having terminal notches and cooperating with a pin resiliently mounted in a housing.

8. The device as claimed in claim 1, wherein said counter-abutment is a collar.

9. The device as claimed in claim 1, wherein said counter-abutment is a magnet support.

* * * * *